United States Patent [19]

Baker

[11] Patent Number: 4,748,141

[45] Date of Patent: May 31, 1988

[54] METAL SULFIDE CATALYST PREPARATION

[75] Inventor: Daniel C. Baker, Houston, Tex.

[73] Assignee: Shell Oil Company, Houston, Tex.

[21] Appl. No.: 43,737

[22] Filed: Apr. 29, 1987

[51] Int. Cl.$^4$ ............... B01J 27/047; B01J 27/04; C01B 17/027
[52] U.S. Cl. ............... 502/216; 48/197 R; 423/215.5; 423/578 R; 502/219
[58] Field of Search ........ 502/216, 219, 527; 423/215.5; 55/178; 48/197 R; 208/198

[56] References Cited

U.S. PATENT DOCUMENTS

| 2,376,223 | 5/1945 | Bender | 502/216 |
| 3,720,627 | 3/1973 | Jarvis | 208/198 |
| 4,671,803 | 6/1987 | Suggitt | 423/215.5 |

OTHER PUBLICATIONS

*Sulfur*, No. 173, Jul.-14 Aug. 1984, pp. 36–37.
Schicho et al., *CEP*, Oct., 1985, pp. 42–44.

Primary Examiner—Paul E. Konopka

[57] ABSTRACT

A sulfide catalyst is prepared by depositing inorganic metal sulfide, by-products from the partial oxidation of fuels and ores, on a surface of a carrier, such as slag.

2 Claims, 1 Drawing Sheet

METAL SULFIDE CATALYST PREPARATION

FIELD OF THE INVENTION

The present invention relates to a metal sulfide catalyst and to a process for the preparation thereof.

BACKGROUND OF THE INVENTION

Partial combustion or gasification of coal involves reacting the coal at elevated temperatures and possibly elevated pressures with a limited volume of oxygen, the reaction preferably being carried out in the presence of additional agents such as steam, carbon dioxide, or various other materials. Gasification of coal produces a gas, known as synthesis gas, that contains mostly carbon monoxide and hydrogen. Also produced are varying quantities of other gases, such as carbon dioxide and methane, and various liquid and solid materials, such as small particles of ash and carbon commonly known and collectively defined herein as flyslag or flyash. This flyslag, because it is derived from a "reducing" atmosphere, tends to be different in composition and properties from flyash normally associated with combustion boilers where a fully oxidizing atmosphere is utilized. For example, the flyslag from processes for partial combustion of a coal may contain elemental iron, sulphides and deposited carbon, components not normally associated with boiler flyash. In general, the flyslag or ligher flyash entrained with the gas in partial combustion processes is usually removed from the raw synthesis gas by a combination of cyclones or separators, or a water scrubbing system employing washer coolers, venturi scrubbers, or filters or electrostatic precipitators, or combinations of these systems.

The raw synthesis gas from the gasifier or gasification zone contains, in addition to the aforementioend materials, sulfur-containing gases, such as hydrogen sulfide and carbonyl sulfide, as well as small amounts of inorganic metal sulfides. The presence of these inorganic metal sulfides as vaporized materials and small fines in synthesis gas derived from the gasification of coal complicates removal of additional impurities such as $H_2S$ and/or $CO_2$, and poses problems insofar as product quality and pollution control requirements are concerned.

The flyslag or flyash removed from the synthesis gas have heretofore generally been considered to have undesirable properties insofar as its ultimate disposal is concerned. For example, it may be light, friable, dusty and difficult to compact. Because it may contain unsuitable species such as arsenic, selenium, and sulfides, it must be handled with care, and, if it is to be utilized or disposed of as landfill, must be in a form which does not release such materials readily to the environment. The invention addresses the problem of flyslag utilization, concomitantly accomplishing the treatment and utilization of other nominal inorganic metal sulfide lighter weight waste products from the gasification process.

SUMMARY OF THE INVENTION

The present invention is directed to a novel catalyst composition comprising a solid carrier having on the surface thereof a catalytic amount of at least one inorganic metal sulfide deposited from a gas stream obtained by the processing of coal, shale, tar sands or mineral ore. The catalyst is useful for degassing sulfur and other conventional sulfide catalyst applications.

The present invention is a useful means to utilize for their catalytic values by-products of synthesis gas production, which previously were regarded as undesirable contaminants and wastes.

The invention also includes a process for the preparation of a metal sulfide catalyst which comprises treating a solid carrier with an inorganic metal sulfide containing gas stream from the processing of coal, shale, tar sands or mineral ore to deposit at least one inorganic metal sulfide from the gas stream on the surface of the carrier. The processing of the substrate, coal, shale, tar sands or mineral ore, includes any conventional process which produces a gas stream containing inorganic metal sulfide(s) as vaporized material or small fines. In one embodiment of the invention, the processing is conveniently the partial oxidation (gasification) of the substrate, e.g., coal.

The inorganic sulfide is deposited on the surface of the carrier, which includes the external surface and surface of any internal pores or passages. The deposit includes physical, chemical and/or physiochemical capture of the vaporized inorganic sulfide or small fines of inorganic sulfide (rich) particles on the carrier.

Any catalytically active inorganic sulfide contained in a gas stream from the processing of coal, shale, tar sands or mineral ore can be used. In one embodiment the inorganic sulfide is selected from CuS, PbS, ZnS, CdS, MgS, CrS, TiS, FeS or mixtures thereof or equivalent kinds of inorganic sulfides. One convenient source of catalytic inorganic metal sulfide is PbS, e.g., a mixture of sulfides rich in PbS, and one convenient source of the mixture is a gas stream produced by the partial oxidation of coal.

The choice of carrier is not critical and includes conventional solid carriers known in the catalyst art. In one embodiment of the invention, the carrier is an inorganic carrier. Suitable examples of inorganic carriers include carbon, inorganic oxides, minerals and solid by-products (e.g., slag) of the processing of coal, shale, tar sands, mineral ores, spent catalyst compositions, or equivalent kinds of solid inorganic carriers. One convenient carrier is slag (flyslag), especially obtained from the partial oxidation of coal.

The recovering of slag particles suitable for use as a carrier is conducted using conventional procedures, e.g., screening, cycloning or the like, to select particles of the size desired. The size will of course depend on the kind of inorganic metal sulfide(s) to be deposited and the ultimate use of the catalyst, which is within the skill of the art. For example, suitable particle sizes include those from about 0.5 mm to about 10 mm.

The catalysts of the invention are useful in conventional processing operations which noramlly employ metal sulfide deposited on a carrier and in particular find utility in the degassing of liquid sulfur wherein hydrogen sulfide and hydrogen polysulfides are removed from liquid sulfur by treatment with the catalyst of this invention, e.g., at about 140°–170° C., preferably, in a trickle or packed bed zone, as described in applicant's concurrently filed U.S. patent application Ser. No. 043,738, filed Apr. 29, 1987, the pertinent disclosure of which is incorporated by reference thereto.

The partial combustion of coal to produce synthesis gas, which is essentially carbon monoxide and hydrogen, and particulate flyslag, is well known, and a survey of known processes is given in "Ullmanns Enzyklopadie Der Technischen Chemie", vol. 10 (1958), pp. 360–458. Several such processes for the preparation of hydrogen and carbon monoxide, flyslag-containing gases are currently being developed. Accordingly, details of the gasification process are related only insofar as is necessary for understanding of the present invention.

In general, the gasification is carried out by partially combusting the coal with a limited volume of oxygen at a temperature normally between 800° C. and 2000° C., and preferably at a temperature of between 1050° C. and 2000° C. If a temperature between 1050° C. and 2000° C. is employed, the product gas may contain very small amounts of gaseous side products such as tars, phenols and condensable hydrocarbons. Suitable coals include lignite, bituminous coal, sub-bituminous coal, anthracite coal, and brown coal. Lignites and bituminous coals are preferred. In order to achieve a more rapid and complete gasification, initial pulverization of the coal is preferred. Particle size is preferably selected so that 70% of the solid coal feed can pass a 200 mesh sieve. The gasification is preferably carried out in the presence of oxygen and steam, the purity of the oxygen preferably being at least 90% by volume, nitrogen, carbon dioxide and argon being permissible as impurities. If the water content of the coal is too high, the coal should be dried before use. The atmosphere will be maintained reducing by the regulation of the weigh ratio of the oxygen to moisture and ash free coal in the range of from about 0.6 to about 1.0, preferably 0.8 to 0.9. The specific details of the equipment and procedures employed form no part of the invention, but those described in U.S. Pat. No. 4,350,103, and U.S. Pat. No. 4,458,607, both incorporated herein by reference, may be employed. Although, in general, it is preferred that the ratio between oxygen and steam be selected so that from 0.1 to 1.0 parts by volume of steam is present per part by volume of oxygen, the invention is applicable to processes having substantially different ratios of oxygen to steam. The oxygen used is preferably heated before being contacted with the coal, preferably to a temperature of from about 200° C. to 500° C.

The details of the gasification reactor system form no part of the present invention, and suitable reactors are described in British Pat. No. 1501284 and U.S. Pat. No. 4,022,591. The high temperature at which the gasification is carried out is obtained by reacting the coal with oxygen and steam in a reactor at high velocity. A preferred linear velocity is from 10 to 100 meters per second, although higher or lower velocities may be employed. The pressure at which the gasification can be effected may vary between wide limits, preferably being from 1 to 200 bar. Residence times may vary widely; common residence times of from 0.2 to 20 seconds are described, with residence times of from 0.5 to 15 seconds being preferred.

After the starting materials have been converted, the reaction product, which comprises hydrogen, carbon monoxide, carbon dioxide, and water, as well as the aforementioned impurities, is removed from the reactor. This gas, which normally has a temperature between 1050° C. and 1800° C., contains the impurities mentioned and flyslag, including carbon-containing solids. In order to permit removal of these materials and impurities from the gas, the reaction product stream should be first quenched and cooled. A variety of elaborate techniques has been developed for quenching and cooling the gaseous stream, the techniques in general being characterized by use of a quench gas and a boiler in which steam is generated with the aid of the waste heat. Cyclones or other suitable techniques may be provided for removing particulate solids from the gaseous stream. Even though such procedures may be practiced, further reduction of the solids content may nevertheless be desirable and can be accomplished by depositing these materials on a carrier, such as slag in an independent process or as steps integrated into a combined gasification-sulfur production system. According, the source of the flyslag is not critical, but, of course, the most usual source will be the flyslag produced in a previous step of the process, or in an associated gasification process scheme if a gasification zone having a multiplicity of reactors is utilized. The flyslag may also be that from which residual carbon values have been removed, as for example, by combustion of "ordinary" flyslag, or as described in copending application Ser. No. 813,737, entitled "Flyash Process", by Hardesty, filed Dec. 27, 1985, incorporated herein by reference. Any suitable selection device or devices, such as screens, may be utilized for the selection of slag suitable for use as a carrier.

In another embodiment of the present invention, a metal sulfide catalyst is prepared by (a) treating coal, shale, tar sands or mineral ore with oxygen to produce a synthesis gas stream containing inorganic metal sulfide; (b) recovering slag particles from the treatment of coal in step (a) suitable for use as a catalyst carrier; and (c) treating the slag particles from step (b) with the synthesis gas stream to deposit a catalytic amount of at least one inorganic metal sulfide on the surface thereof.

BRIEF DESCRIPTION OF THE DRAWING

The FIGURE is a schematic representation of the coal gasification embodiment of a method of preparing the novel catalyst of the present invention.

DETAILED DESCRIPTION OF THE INVENTION

Figure 1:
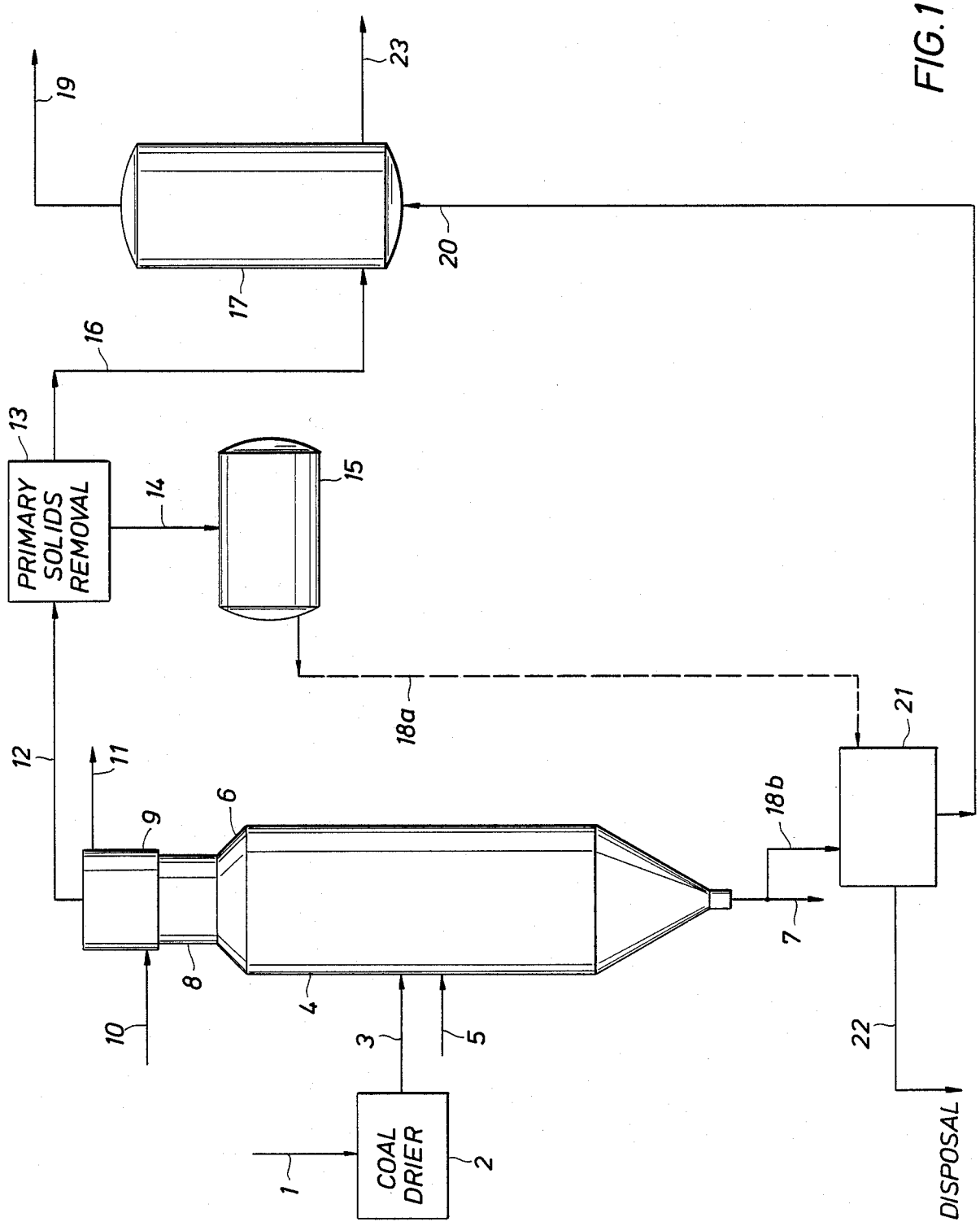

Accordingly, with reference to the FIG., pulverulent coal is passed via line (1) into a coal dryes (2) where the coal is dried, suitably at a temperature of about 200° C. The dry coal is subsequently discharged through a line (3) and passed into a gasification reactor (4) where it is gasified at a temperature of about 1500° C. to about 2000° C., a pressure of about 35 atmospheres abolute, with oxygen, which is supplied through a line (5). Dual coal injection is also contemplated. The gasification produces a product or synthesis gas which is removed from the upper portion (6) of the reactor, and a slag which is removed form the lower portion of the reactor via line (7). The gasification product is removed via conduit (8) where it is quenched and then passed through a boiler or heat exchange zone (9) where it is cooled to a temperature of about 200° C. In the heat exchange (9), water which is supplied through line (10) is converted by indirect heat exchange to high pressure steam, the steam being discharged through line (11). The cooled gasification product is passed through a line (12) to a series of cyclones (13) where the bulk of the particulates (flyslag) is removed and sent via line (14) to storage in vessel (15). The synthesis gas then passes via line (16) to treating zone (17) where it is contacted with slag carrier particles.

The slag from gasification reactor (4) and/or vessel (15) is sent via lines (18a) and/or preferably (18b) to the carrier selection unit (21) where it is processed, e.g., screened, to select carrier grade slag particles, e.g. from about 0.5 mm to about 10 mm, for utilization as a catalyst carrier and the remainder of the slag is removed via exit line (22) for other utilization or disposal. The size slag particles suitable for a carrier is not critical but of a size generally useful in the catalyst art. The slag selected as suitable for use as a carrier is passed via line (20) to treating zone (17) wherein it is contacted with synthesis gas, preferably in cartridge units. The treating zone is maintained at elevated temperatures and pressures and flow rates sufficient to aid deposit of the metal sulfide. While this may vary to some degree depending on the metal sulfide, such conditions are within the conventional skill of the catalyst art. The synthesis gas stream entering the treating zone usually will have a temperature of about 150° C. to about 400° C. and a pressure of about 20–30 atmospheres. After the treating, synthesis gas passes from zone (17) through line (19) on to further treatment and/or recovery. Inorganic metal sulfide catalyst having the slag support is removed via line (23).

While the invention has been illustrated with particular apparatus, those skilled in the art will appreciate that, except where specified, other equivalent or analogous units may be employed. The term "zone", as employed in the specification and claims, includes, where suitable, the use of segmented equipment operated in series, or the division of one unit into multiple units to improve efficiency or overcome size constraints, etc. For example, a series of treating zones might be employed, with different carriers. Parallel operation of units is, of course, well within the scope of the invention.

What is claimed:

1. A process for the preparation of a metal sulfide catalyst which comprises (a) treating coal, shale, tar sands or mineral ore with oxygen at 800°–2000° C. and 1–200 bar pressure to produce a synthesis gas stream containing inorganic metal sulfide selected from the group consisting of CuS, PbS, ZnS, CdS, MgS, CrS, TiS, FeS and mixtures thereof; (b) recovering slag particles from the treatment of coal in step (a) suitable for use as a catalyst carrier; and (c) treating the slag particles from step (b) at 150°–400° C. and 20–30 atmospheres with the synthesis gas stream to deposit a catalytic amount of said inorganic metal sulfide or said mixtures of organic metal sulfides from (a) on the surface thereof.

2. A process according to claim 1 wherein the inorganic sulfide is PbS.

* * * * *